United States Patent [19]

Nii

[11] Patent Number: 5,473,228
[45] Date of Patent: Dec. 5, 1995

[54] CONTROL METHOD FOR ELECTRICAL APPLIANCE IN HYBRID VEHICLE

[75] Inventor: Yoshihide Nii, Fuji, Japan

[73] Assignee: Toyota Jidosha Kabushiki Kaisha, Aichi, Japan

[21] Appl. No.: 313,788

[22] Filed: Sep. 28, 1994

[30] Foreign Application Priority Data

Oct. 7, 1993 [JP] Japan ............................. 5-251560

[51] Int. Cl.$^6$ .............................. H02P 9/10; B60L 11/02
[52] U.S. Cl. ........................... 318/158; 318/139; 290/17; 322/17
[58] Field of Search ................................. 318/139, 140, 318/141, 142, 143, 147, 157, 158; 290/9, 10, 11, 14, 15, 17, 40 R, 51; 322/17, 21, 22, 23, 24, 25; 364/424.05

[56] References Cited

U.S. PATENT DOCUMENTS

| 3,792,327 | 2/1974 | Waldorf . |
| 3,953,775 | 4/1976 | Friend et al. . |
| 4,012,677 | 3/1977 | Rist et al. . |
| 4,489,242 | 12/1984 | Worst . |
| 5,141,173 | 8/1992 | Lay . |
| 5,256,959 | 10/1993 | Nagano et al. . |
| 5,416,702 | 5/1995 | Kitagawa et al. . |

FOREIGN PATENT DOCUMENTS

| 125320 | 11/1984 | European Pat. Off. . |
| 543390 | 5/1993 | European Pat. Off. . |
| 570240 | 11/1993 | European Pat. Off. . |
| 4204384 | 8/1993 | Germany . |
| 50-107610 | 8/1975 | Japan . |
| 93/07018 | 4/1993 | WIPO . |

OTHER PUBLICATIONS

Patent Abstracts of Japan, vol. 8, No. 140 (M-305), JP 59,037,804 (1984), Kanji Aoki et al., "Industrial Vehicle".

Primary Examiner—Bentsu Ro
Attorney, Agent, or Firm—Oliff & Berridge

[57] ABSTRACT

A control method for an electrical appliance in a hybrid vehicle. When the electric appliance is connected, the output of the engine is maintained by reducing the output of the generator by the equivalent of the power consumed by the electric appliance while maintaining the revolution speed of the engine. The revolution speed of the engine is then gradually increased by adjusting the field current of the generator while monitoring the output of the generator. When the output of the engine is increased by the power consumed by the electric appliance, the engine is operated at a constant revolution speed and a constant output at the operation point on the output line of the engine with WOT. Thus, the engine is prevented from stopping due to a rapid increase in the load. Owing to a gentle change in the output, the emission is favorable. Since the output of the engine does not deviate from the output line of the engine with WOT (wide open throttle), the fuel consumption is also good.

15 Claims, 8 Drawing Sheets

TURN ON AIR CONDITIONING SYSTEM

5,473,228

CONTROL METHOD FOR ELECTRICAL APPLIANCE IN HYBRID VEHICLE

BACKGROUND OF THE INVENTION

1. Field of the Invention

The present invention relates to a hybrid vehicle in which the engine drives a generator so as to generate the electric power for a driving motor and the output of the engine drives an electrical appliance such as an air conditioning system. More particularly, the present invention relates to a control method for an electrical appliance such as an air conditioning system especially at the time of starting and stopping the air conditioning system.

2. Description of the Related Art

An electric vehicle provided with an engine as well as a driving motor, namely, a hybrid vehicle is well known. For example, in a series hybrid vehicle, a generator is driven by the engine, and the motor is driven by the output of the generator. The motor is also driven by the discharge output of a battery mounted on the vehicle. The battery is charged by the output of the generator as well as by external power and regenerated power. This type of a vehicle is therefore advantageous in that a reduction in the size of the battery mounted thereon, as well as the frequency charging the battery by external power, is possible.

It is favorable from the point of view of comfortable driving conditions to mount an air conditioning system on a vehicle, such as an electric vehicle. In order to mount an air conditioning system on a vehicle, it is necessary to somehow produce power for driving the system on the vehicle. In the case of an electric vehicle, it is possible to utilize the output of the generator and the discharge power of the battery as the driving power for the air conditioning system. This method, however, is disadvantageous from the point of view of cost, because since the air conditioning system is driven by electric power, a motor or the like for driving a compressor of the air conditioning system is necessary. In contrast, as a method which is advantageous from the point of view of cost, there is a method of diverting an air conditioning system of a vehicle driven only by an engine, i.e., connecting the output shaft of the engine to the compressor of the air conditioning system so as to drive the compressor by the mechanical output of the engine.

In such a method of driving the compressor by the output of the engine, however, the load of the engine rapidly increases at the time of turning on the air conditioning system. This rapidly reduces the revolution speed of the engine and, in a worst case, stops the engine. In order to prevent the engine from stopping in this way, it is possible to increase the output of the engine by the equivalent to the consumption of the air conditioning system when the air conditioning system is turned on. However, the rapid increase in the output of the engine leads to an increase in the harmful exhaust gas component emitted from the engine. This is contrary to the intended purpose of an electric vehicle, that is, to prevent environmental pollution. In addition, in the case of a hybrid electric vehicle in which the engine is driven with high efficiency with a wide open throttle (WOT) so as to obtain good emission and the fuel consumption at the time of ordinary driving, a rapid increase in the output of the engine deviates from the output line of the engine with WOT. As a result, the emission and fuel consumption increase, thereby detracting from the merits of a hybrid vehicle brought about by operating with WOT.

SUMMARY OF THE INVENTION

Accordingly, it is an object of the present invention to eliminate the above-described problems in the related art and to prevent an engine from stopping at the time of starting or stopping an electrical appliance such as an air conditioning system by controlling the engine and a generator when the electrical appliance is driven by the engine.

It is another object of the present invention to prevent an increase in the emission.

It is still another object of the present invention to prevent an increase in the fuel consumption.

To achieve these aims, in a first aspect of the present invention, there is provided a control method for an electrical appliance such as an air conditioning system in a hybrid vehicle having a motor for generating a driving power for the vehicle, a generator which can control a field current and which supplies the generated driving power to the motor, and an engine for rotating the generator and driving the electrical appliance, the method comprising:

a) a first step of varying the field current of the generator at the time of starting the electrical appliance so as to reduce the output of the generator by the equivalent of the output which is supplied from the engine to the electrical appliance while maintaining the revolution speed of the engine;

b) a second step of gradually increasing the number of revolution of the engine by varying the field current of the generator while comparing the output of the generator with a gradually increasing target thereof; and c) a third step of operating the engine at a constant revolution speed and a constant output at the point of time where the output of the generator has reached an increased target.

In a second aspect of the present invention, there is provided a control method for an electrical appliance in a hybrid vehicle having a motor for generating driving power for the vehicle, a generator which can control a field current and which supplies a generated driving power to the motor, and an engine for rotating the generator and driving an electrical appliance, the method comprising:

a) a fourth step of varying the field current of the generator at the time of stopping the electrical appliance so as to increase the output of the generator by the equivalent of the output which is supplied from the engine to the electrical appliance while maintaining the revolution speed of the engine;

b) a fifth step of gradually decreasing the revolution speed of the engine by varying the field current of the generator while comparing the output of the generator with a gradually decreasing target thereof; and c) a sixth step of operating the engine at a constant number of revolution and a constant output at the point of time where the output of the generator has reached a decreased target.

In a third aspect of the present invention, there is provided a control method for an electrical appliance in a hybrid vehicle having a motor for generating a driving power for the vehicle, a generator which can control a field current and which supplies a generated driving power to the motor, and an engine for rotating the generator and driving an electrical appliance, the method comprising:

a) a first step of varying the field current of the generator at the time of starting the electrical appliance so as to reduce the output of the generator by the equivalent to the output which is supplied from the engine to the electrical appliance while maintaining the revolution speed of the engine;

b) a second step of gradually increasing the revolution speed of the engine by varying the field current of the generator while comparing the output of the generator with a gradually increasing target thereof;

c) a third step of operating the engine at a constant revolution speed and a constant output at the point of time where the output of the generator has reached an increased target;

d) a fourth step of varying the field current of the generator at the time of stopping the electrical appliance so as to increase the output of the generator by the equivalent of the output which is supplied from the engine to the electrical appliance while maintaining the revolution speed of the engine;

e) a fifth step of gradually decreasing the revolution speed of the engine by varying the field current of the generator while comparing the output of the generator with a gradually decreasing target thereof; and f) a sixth step of operating the engine with a constant revolution speed and a constant output at the point of time where the output of the generator has reached a decreased target.

In the present invention, when the electrical appliance is started, the field current of the generator is varied so that the output of the generator is reduced while the revolution speed of the engine is maintained. Since the reduction is equivalent to the output which is supplied from the engine to the electric appliance, the load of the engine is not increased in spite of the connection of the electric appliance. In this state, the revolution speed of the engine is gradually increased by gradually varying the field current of the generator until the output of the generator has reached the target. When the output of the generator has reached the target, the engine is operated at a constant revolution speed and a constant output. On the other hand, when the electrical appliance is stopped, the output of the generator is temporarily increased, the revolution speed of the engine is then gradually decreased, and finally the engine is operated at a constant revolution speed and a constant output.

In this way, since the output of the engine is not rapidly changed at the time of starting or stopping the electric appliance, the revolution speed of the engine is not rapidly reduced, nor is the engine stopped. Unlike the structure of rapidly changing the output of the engine at the time of starting or stopping the electric appliance, there is no increase either in the emission of the engine or in the fuel consumption.

The field current is varied at the first and fifth steps by setting a reference revolution speed of the engine and controlling the duty ratio of the field current in accordance with a signal with the duty ratio modulated on the basis of the difference between the revolution speed of the engine and the reference revolution speed thereof. The field current is varied at the second and fourth steps by repeating the operation of minutely varying the reference revolution speed of the engine and the operation of controlling the duty ratio of the field current in accordance with a signal with the duty ratio modulated on the basis of the difference between the revolution speed of the engine and the reference revolution speed thereof. The variation of the field current in any of these steps is executed with reference to a map which shows the relationship between the revolution speed of the engine, and the output of and the field current of the generator.

In a fourth aspect of the present invention, there is provided a control method for an electrical appliance in a hybrid vehicle having a motor for generating driving power for the vehicle, a generator which can control a field current and which supplies generated driving power to the motor, and an engine for rotating the generator and driving the electrical appliance, the method comprising:

a) a seventh step of varying the field current of the generator at the time of starting the electrical appliance so as to reduce the output of the generator by the equivalent of the output which is supplied from the engine to the electrical appliance while maintaining the revolution speed of the engine;

b) an eighth step of gradually increasing the output of the engine while maintaining the revolution speed of the engine and comparing the output of the generator with a gradually increasing target thereof; and c) a ninth step of operating the engine at a constant revolution speed and a constant output at the point of time where the output of the generator has reached an increased target.

In a fifth aspect of the present invention, there is provided a control method for an electrical appliance in a hybrid vehicle having a motor for generating driving power for the vehicle, a generator which can control a field current and which supplies generated driving power to the motor, and an engine for rotating the generator and driving an electrical appliance, the method comprising:

a) a tenth step of varying the field current of the generator at the time of stopping the electrical appliance so as to increase the output of the generator by the equivalent of the output which is supplied from the engine to the electrical appliance while maintaining the revolution speed of the engine;

b) an eleventh step of gradually decreasing the output of the engine while maintaining the revolution speed of the engine and comparing the output of the generator with a gradually increasing target thereof; and c) a twelfth step of operating the engine at a constant revolution speed and a constant output at the point of time where the output of the generator has reached a decreased target.

In a sixth aspect of the present invention, there is provided a control method for an electrical appliance in a hybrid vehicle having a motor for generating driving power for the vehicle, a generator which can control a field current and which supplies generated driving power to the motor, and an engine for rotating the generator and driving an electrical appliance, the method comprising:

a) a seventh step of varying the field current of the generator at the time of starting the electrical appliance so as to reduce the output of the generator by the equivalent of the output which is supplied from the engine to the electrical appliance while maintaining the revolution speed of the engine;

b) an eighth step of gradually increasing the output of the engine while maintaining the revolution speed of the engine and comparing the output of the generator with a gradually increasing target thereof;

c) a ninth step of operating the engine with a constant revolution speed and a constant output at the point of time where the output of the generator has reached an increased target;

d) a tenth step of varying the field current of the generator at the time of stopping the electrical appliance so as to increase the output of the generator by the equivalent of the output which is supplied from the engine to the electrical appliance while maintaining the revolution speed of the engine;

e) an eleventh step of gradually reducing the output of the engine while maintaining the revolution speed of the engine and comparing the output of the generator with a gradually decreasing target thereof; and f) a twelfth step of operating the engine at a constant revolution speed and a constant output at the point of time where the output of the generator has reached a decreased target.

In the present invention, when the electrical appliance is started, the field current of the generator is varied so that the output of the generator is reduced while the revolution speed of the engine is maintained. Since the reduction is equivalent of the output of the engine which is supplied from the engine to the electric appliance, the load of the engine is not increased. In this state, the output of the engine is gradually increased while the revolution speed of the engine is maintained until the output of the generator has reached a target. When the output of the generator has reached the target, the engine is operated at a constant revolution speed and a constant output. On the other hand, when the electrical appliance is stopped, the output of the generator is temporarily increased, the output of the engine is then gradually lowered, and finally the engine is operated at a constant revolution speed and a constant output.

In this way, since the output of the engine is not suddenly changed at the time of starting or stopping the electric appliance, the revolution speed of the engine is not suddenly reduced, nor is the engine stopped. Unlike the structure where the output of the engine is rapidly changed at the time of starting or stopping the electric appliance, there is no increase in the emission of the engine.

The above and other objects, features and advantages of the present invention will become clear from the following description of the preferred embodiments thereof, taken in conjunction with the accompanying drawings.

DESCRIPTION OF THE PREFERRED EMBODIMENTS

The preferred embodiments of the present invention will be explained hereinunder with reference to the accompanying drawings.

System structure

Figure 1:
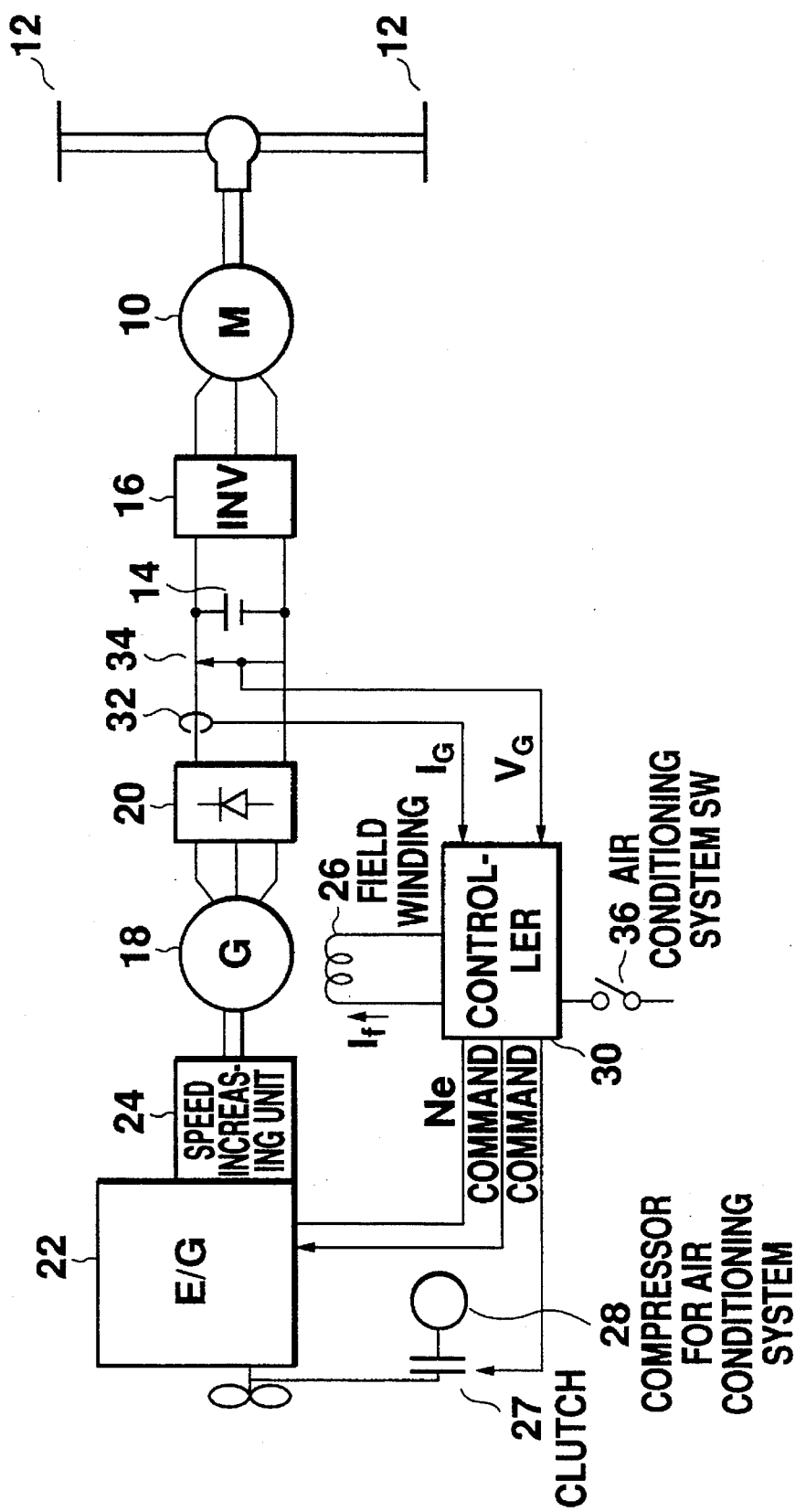
FIG. 1 is a block diagram showing the structure of a preferred apparatus for embodying the present invention.

FIG. 1 shows the structure of a preferred apparatus for embodying the present invention. The apparatus shown in FIG. 1 is a driving system of a series hybrid vehicle.

The vehicle shown in FIG. 1 has a driving motor 10 as a driving source. Drive wheels 12 are rotated by the rotation of the motor 10, thereby driving the vehicle. The motor 10 is a three-phase AC motor, and the driving power for the motor 10 is supplied from a battery 14 mounted on the vehicle through an inverter 16. The inverter 16 converts the discharge power of the battery 14 into a current which corresponds to the necessary output torque under the control of appropriate equipment (not shown) and supplies the current to the motor 10.

Not only the discharge power of the battery 14 but also the output of an AC generator 18 is supplied to the inverter 16. The output of the AC generator 18 is rectified by a rectifier 20 and supplied to the inverter 16. Therefore, the motor 10 is also driven by the output of the generator 18. In addition, since the battery 14 is connected in parallel with the generator 18, seen from the inverter 16, the battery 14 is charged not only by an external charging equipment (not shown) and the regenerated power of the motor 10 but also by the output of the generator 18.

The generator 18 is rotated by the output of the engine 22. Since the output of the engine 22 is supplied to the generator 18 after the revolution speed of the engine 22 is increased to an appropriate speed by a speed increasing unit 24, it is possible to produce a necessary output from the generator 18 by supplying an appropriate field current $I_f$ to a field winding 26.

A compressor 28 for an air conditioning system is connected to the engine 22 through a clutch 27. Therefore, when the clutch 27 is connected, the compressor 28 for an air conditioning system as well as the generator 18 becomes a load on the engine 22.

A controller 30 is a means for controlling the engine 22, the generator 18 and the clutch 27. The controller 30 controls the throttle angle, the fuel injection, etc. of the engine 22 as occasion demands, and also controls the field current $I_f$ of the generator 18. The controller 30 not only inputs the detected revolution speed $N_e$ of the engine 22 but also detects the output current $I_G$ of the rectifier 20 and the output voltage $V_G$ of the rectifier 20 by a current sensor 32 and a voltage sensor 34, respectively. The controller 30 further inputs the state of an air conditioning system SW 36 which is operated by the driver or the like, and when the air conditioning system SW 36 is turn on, the clutch 27 is connected, while the air conditioning system SW 36 is turned off, the clutch 27 is disconnected.

First embodiment

Figure 2:
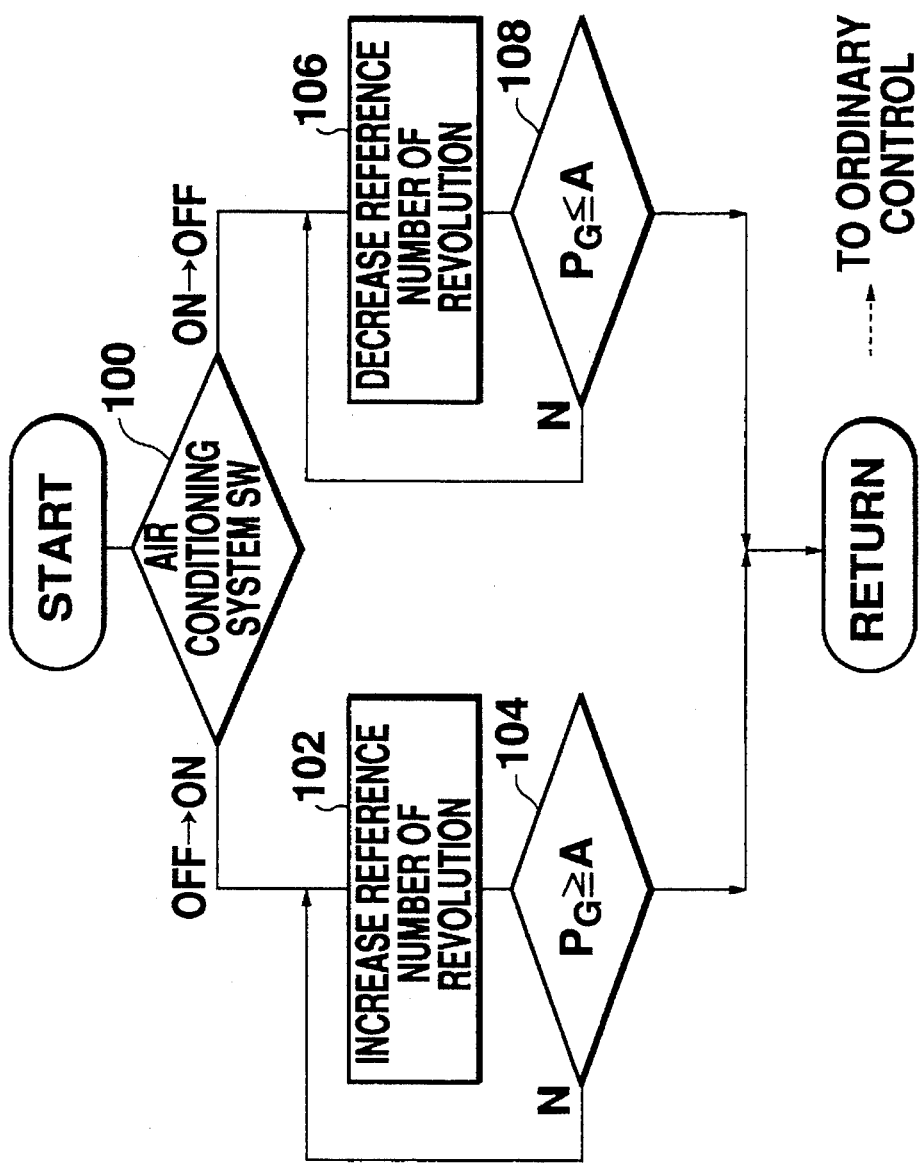
FIG. 2 is a flowchart of a first embodiment of a control method for an air conditioning system according to the present invention.

FIG. 2 shows the operation on the controller 30 in a first embodiment of the present invention. The control show in FIG. 2 is executed by using the ON/OFF switch of the air conditioning system SW 36 as a trigger (100). As shown in FIG. 2, when the air conditioning system SW 36 is changed form OFF to ON, the reference revolution speed $N_{ref}$ of the engine 22 for engine control is gradually increased by the predetermined minute amount (step 102) until the output $P_G$ of the generator 18 reached the output (target) A before the operation of the air conditioning system SW 36 (step 104). When the output $P_G$ reaches the target A, the control is shifted to ordinary control. On the other hand, when the air conditioning system SW 36 is changed from ON to OFF, the reference revolution speed $N_{ref}$ of the engine 22 is gradually decreased by a predetermined minute amount the target A (step 108). When the output $P_G$ reaches the target A, the control is shifted to ordinary control.

Figure 3:
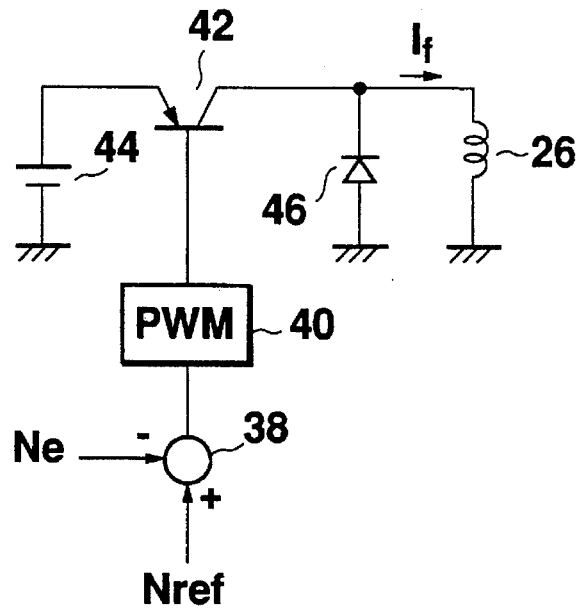
FIG. 3 is a block diagram showing a part of the structure of the controller in the first embodiment; of the generator at the time of turning on/off the air conditioning system.

FIG. 3 shows the structure of the field current output portion of the controller 30 in the first embodiment. A subtracter 38 obtains the difference between the reference revolution speed $N_{ref}$ which is gradually increased and decreased at the steps 102 and 106, respectively, and the actual revolution speed $N_e$ of the engine 22. A PWM circuit 40 generates a PWM (pulse width modulation) signal on the basis of the difference obtained. The signal output from the PWM circuit 40 is applied to the base of a transistor 42 for field current control. When the transistor 42 is turned on, the field current $I_f$ is supplied from a control power source 44 to the field winding 26. Therefore, in this embodiment, the duty and, hence, the effective value of the field current $I_f$ is changed by changing the reference revolution speed $N_{ref}$ at the steps 102 or 106. The reference numeral 46 in FIG. 3 represents a commutating diode.

Figure 4:
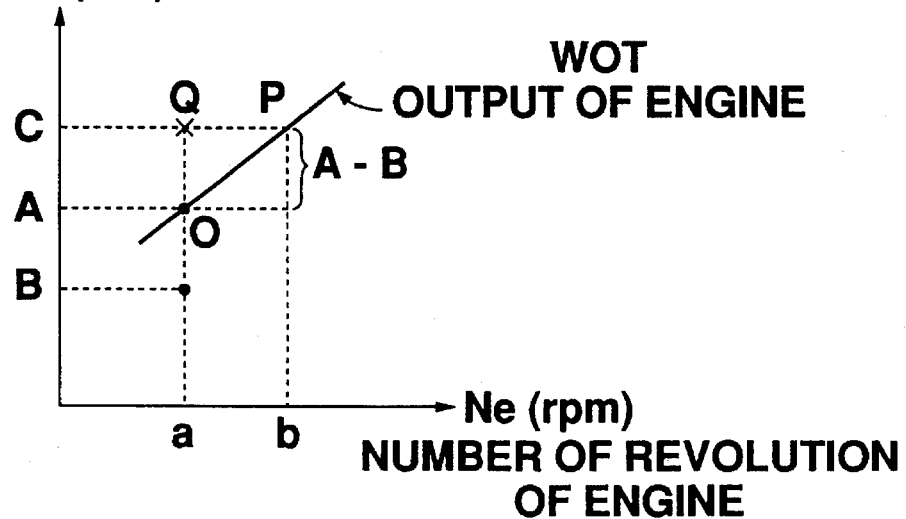

FIG. 4 shows the principle of the control of the output of the generator in this embodiment. As shown in FIG. 4, when the engine 22 is operated with WOT, the revolution speed $N_e$ of the engine 22 directly corresponds to the output $P_e$ of the engine 22.

It is now assumed that the air conditioning system SW 36 is off at a certain point. At this point, the load on the engine 22 is only the generator 18. It is also assumed that the output $P_G$ of the generator 18=the output $P_e$ of the engine 22=A. If the revolution speed $N_e$ of the engine 22 at this point is represented by "a", the operating point is the point O. The solid line indicates the output line of the engine 22 when the engine 22 is driven with WOT.

When the clutch 27 is connected in this state, if there is no control, the revolution speed $N_e$ of the engine 22 is reduced due to a rapid increase of the load. In this embodiment, however, the output $P_G$ namely, the load on the generator 18, is temporarily reduced in the load of the engine 22 by controlling the field current $I_f$. That is, by controlling the field current $I_f$, the revolution speed $N_e$ of the engine 22 is so controlled as to have a constant reference value (a). The reduction of the output $P_G$ of the generator 18 at this time corresponds to the output which is supplied from the engine 22 to the compressor 28 for an air conditioning system, and if the output $P_G$ of the generator 18 after reduction is represented by B, the reduction is represented by A–B. In other words, in this embodiment, since the revolution speed $N_e$ of the engine 22 is so controlled as to have a reference value by controlling the field current $I_f$, the revolution speed $N_e$ of the engine is not suddenly reduced, nor is the engine 22 stopped which would be incidental to the connection of the compressor 28 for an air conditioning system in the related art. In addition, since the output $P_e$ of the engine 22 is not rapidly increased, the emission is not increased.

In this state, however, the output $P_G$ of the generator 18 does not reach the target A. In this embodiment, the field current $I_f$ is adjusted while the output $P_G$ of the generator 18 is monitored so that the reference revolution speed $N_{ref}$ is gradually increased by a minute amount until the output $P_G$ of the generator 18 reaches the target A. The output $P_G$ of the generator 18 is obtained on the basis of the output current $I_G$ and the output voltage $V_G$ detected by the sensors 32 and 34, respectively.

Figure 5:
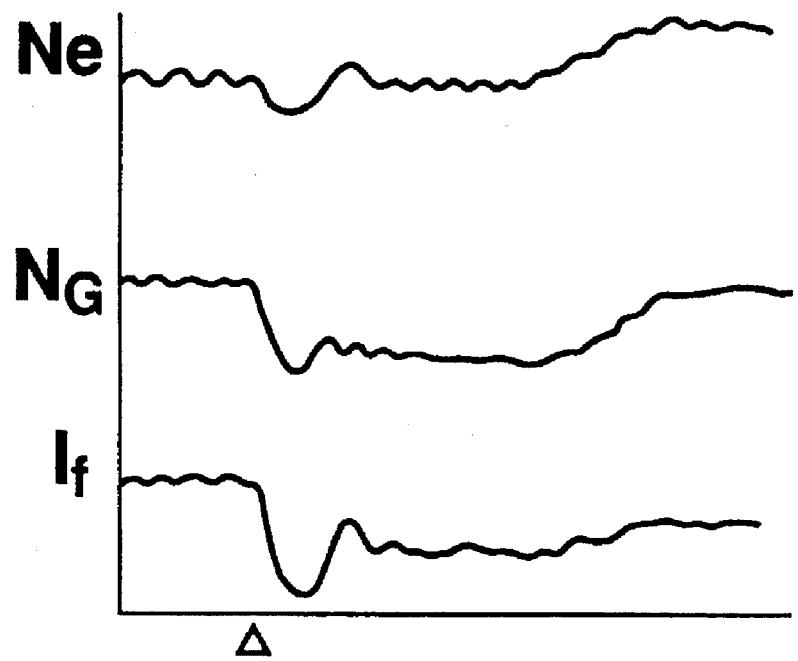
FIG. 5 shows the operation of the engine and the generator in the first embodiment shown in FIG. 2.

When the reference revolution speed $N_{ref}$ is gradually increased, a difference is caused between the reference revolution speed $N_{ref}$ and the actual revolution speed $N_e$ of the engine 22. The field current $I_f$ is varied so as to cancel the difference. By this operation, the load of the generator 18 varies in the load of the engine 22, so that the output $P_e$ of the engine 22 gradually increases. Thereafter, when $P_G \geq A$, the output $P_e$ of the engine 22 becomes 2A–B, which is the value C obtained by adding the consumption A–B of the compressor 28 for an air conditioning system to the output $P_G$=A of the generator 18. At this point, the control is shifted to ordinary control, and the engine 22 is operated at a constant revolution speed "b" and a constant output C at the operation point P. According to this control, the output $P_e$ of the engine 22 moves on the output line of the engine with WOT, so that the fuel consumption as well as the emission is improved. When the compressor 28 for an air conditioning system is connected to the engine 22, various values are apt to change, as shown in FIG. 5. The field current $I_f$ is not always reduced, as will be described later.

According to this embodiment, when the compressor 28 for an air conditioning system is connected to the engine 22, the engine 22 does not stop, nor is there any increase in the emission or the fuel consumption. A similar effect is produced when the compressor 28 for an air conditioning system is separated from the engine 22. Although a fluctuation of the reference revolution speed $N_{ref}$ of the engine 22 slightly increases with the connection of the compressor 28 for an air conditioning system, this is negligible because the response of the output $P_G$ of the generator 18 to the control of the field current $I_f$ is very quick.

Second embodiment

Figure 6:
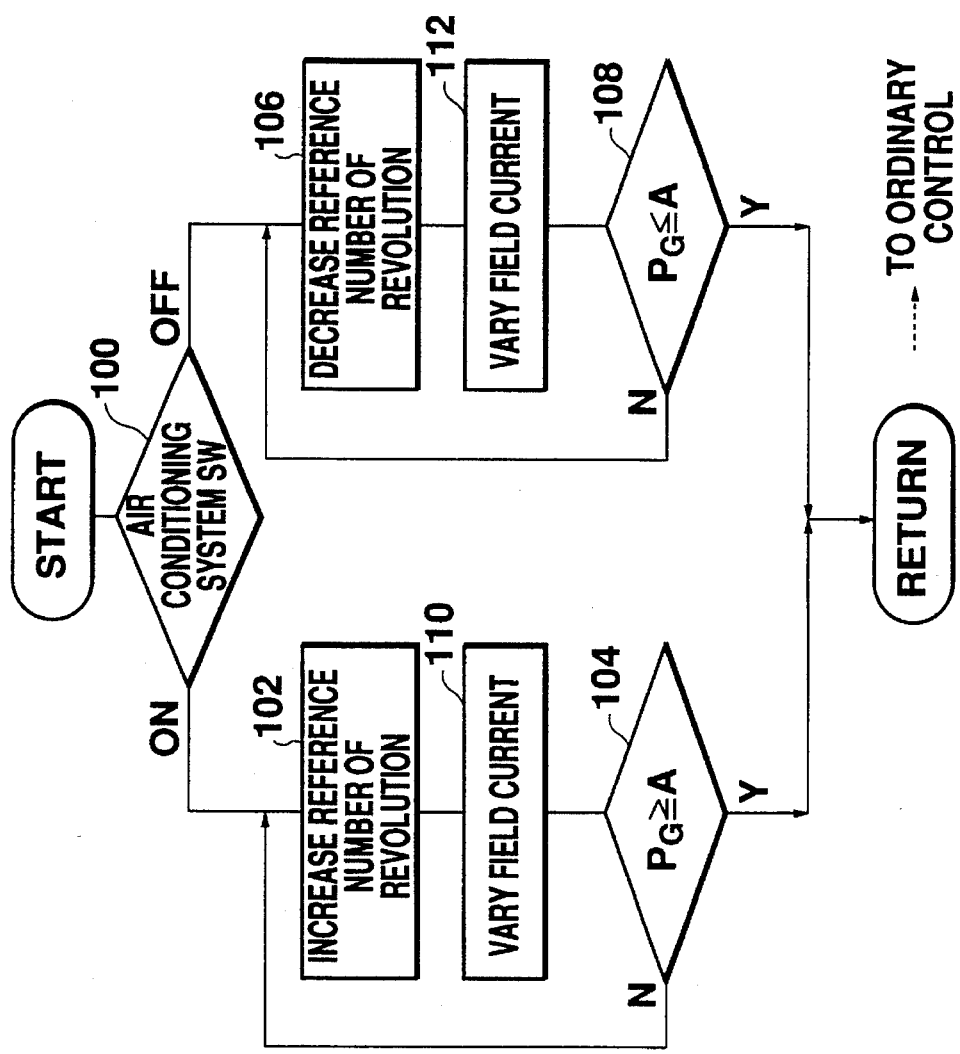
FIG. 6 is a flowchart of a second embodiment of a control method for an air conditioning system according to the present invention.
Figure 7:
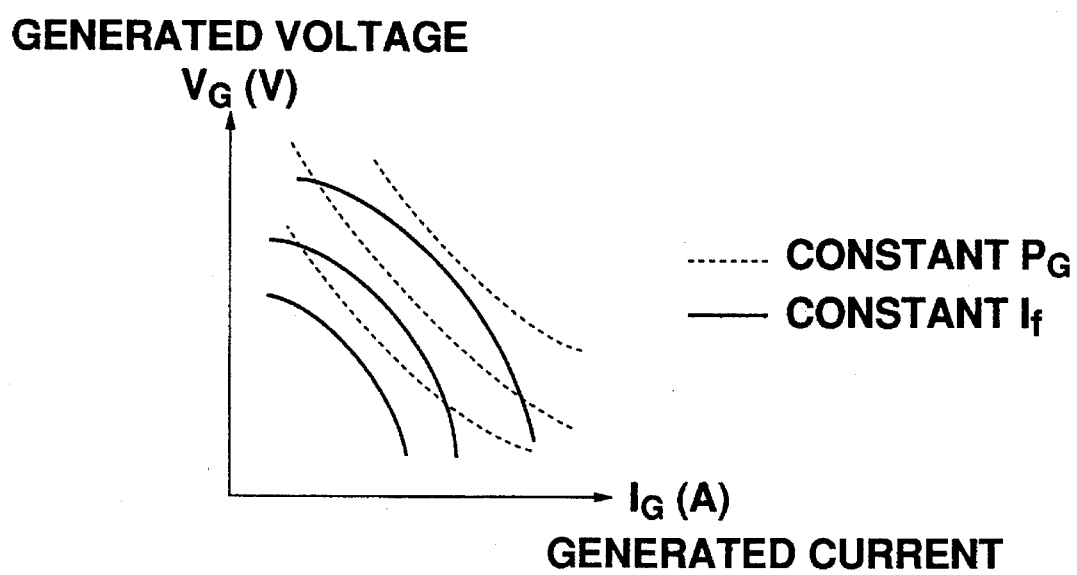
FIG. 7 shows an example of a map used in the second embodiment shown in FIG. 6.

FIG. 6 shows the operation of the controller 30 in a second embodiment of the present invention. In this embodiment, an output portion such as that shown in FIG. 3 is not used. The control shown in FIG. 6 is the same as that shown in FIG. 2 except that the step 110 is added after the step 102 and that the step 106 is added after the step 112. At the steps 110 and 112, the field current $I_f$ is calculated and set on the basis of the reference revolution speed $N_{ref}$ with reference to a map such as that shown in FIG. 7. Since the revolution speed $N_e$ of the engine 22 is constant in the map shown in FIG. 7, a plurality of maps are necessary in accordance with the numbers $N_e$ of revolution. Similar effects to those in the first embodiment are produced by the second embodiment. However, there is a tendency of the curve, showing the relationship between the output voltage $V_G$ and the output current $I_G$ when the output $P_G$ of the generator 22 is constant to be different from the curve showing the relationship between the output voltage $V_G$ and the output current $I_G$ when the field current $I_f$ is constant, so that the increase in the reference revolution speed $N_{ref}$ does not always result in the decrease in the field current $I_f$, thereby making the control slightly complicated.

Third embodiment

Figure 8:
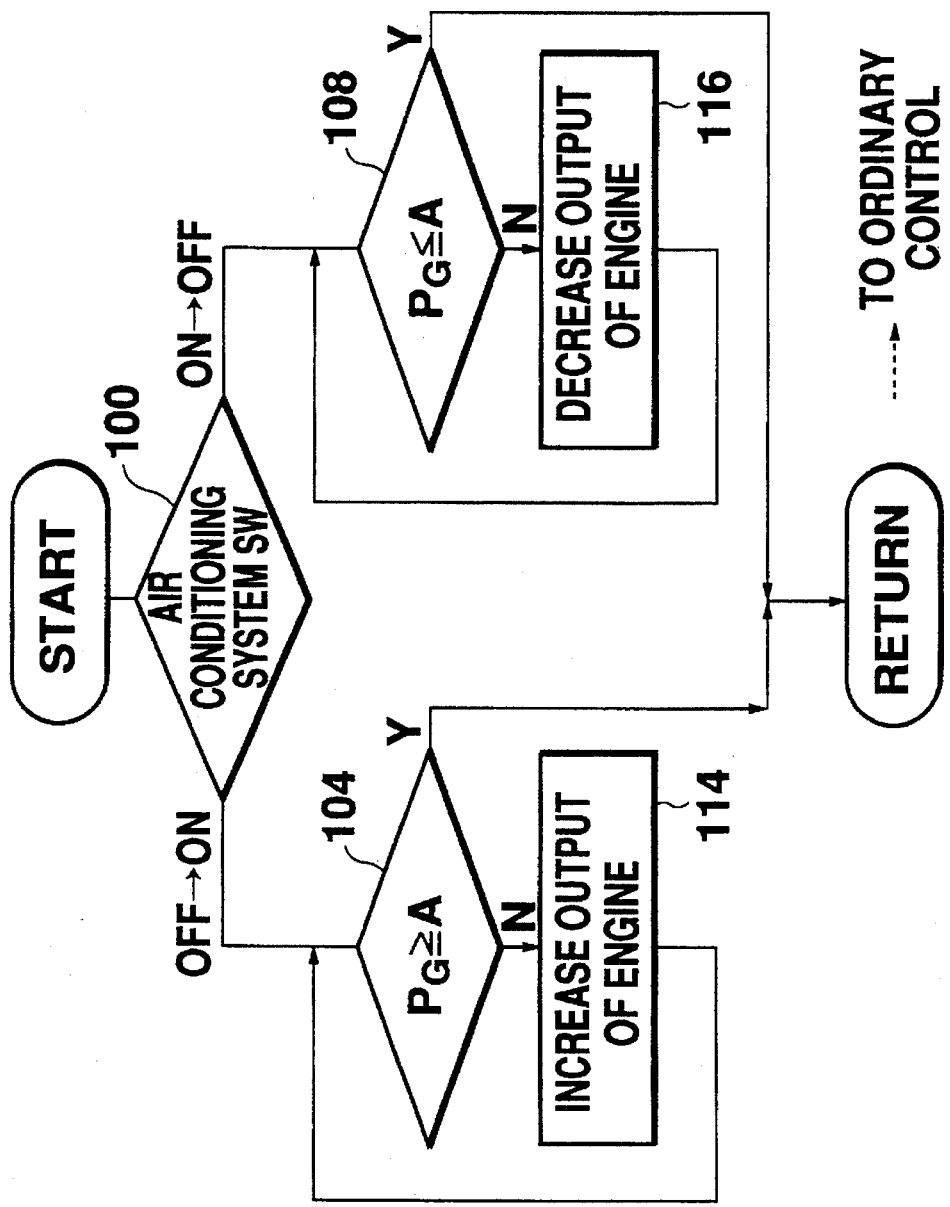
FIG. 8 is a flowchart of a third embodiment of a control method for an air conditioning system according to the present invention.
Figure 9:
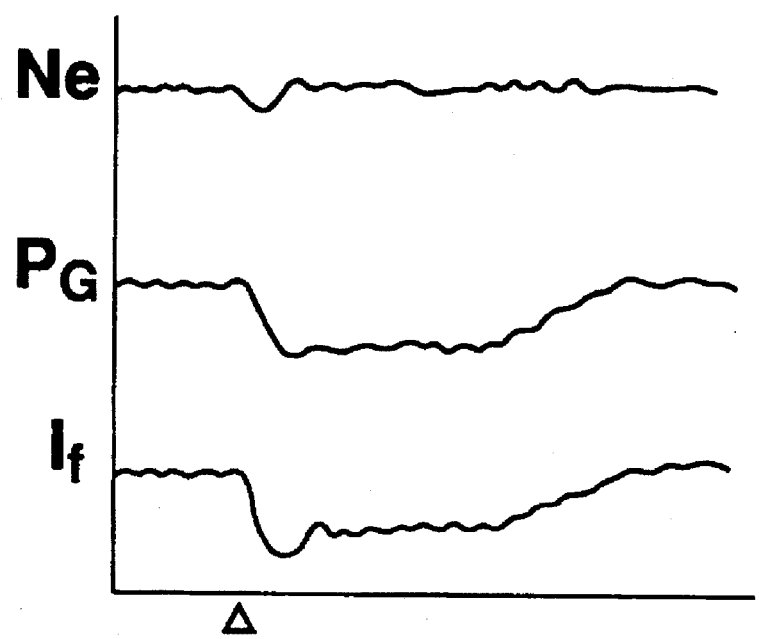
FIG. 9 shows the operation of the engine and the generator in the third embodiment shown in FIG. 8.

FIG. 8 shows the operation of the controller 30 in a third embodiment of the present invention. In the control shown in FIG. 8, when the air conditioning system SW 36 is changed from OFF to ON, the output $P_e$ of the generator 18 is gradually increased (step 114) until the output $P_G$ of the generator 18 reaches the target A (step 104). When the output $P_G$ reaches the target A, the control is shifted to ordinary control. On the other hand, when the air conditioning system SW 36 is changed from ON to OFF, the output $P_e$ of the engine 22 is gradually decreased (step 116) until the output $P_G$ of the generator 18 reaches the target A (step 108). When the output $P_G$ reaches the target A, the control is shifted to ordinary control. When the compressor 28 for an air conditioning system is connected to the engine 22, various values are apt to change, as shown in FIG. 9.

In this embodiment, when the compressor 28 for an air conditioning system is connected to the engine 22, the field current $I_f$ of the generator 18 is controlled so that the revolution speed $N_e$ of the engine is held at a constant value, the output $P_e$ of the engine 22 is temporarily reduced by A–B, and thereafter the output $P_e$ of the engine 22 is gradually increased by A–B by gradually increasing the throttle angle and the fuel injection of the engine 22. By this control, the operation point shifts from O to Q. Since the output of the engine 22 deviates from the output line of the engine 22 with WOT in comparison with the first or second embodiment, the fuel consumption is slightly disadvantageous.

Although the compressor 28 for an air conditioning system is explained as an electric appliance which is driven by the engine 22 in the above embodiments, the present invention is applicable to any other electric appliance which is driven by the engine 22. For example, the present invention is applicable to a pump for power steering, a pump for a brake assistor, an alternator for charging a battery for an electric appliance (battery for supplying a power to an electric appliance), etc.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A control method for an electrical appliance in a hybrid vehicle having a motor for generating a driving power for said vehicle, a generator which can control a field current and which supplies the generated driving power to said motor, and an engine for rotating said generator and driving said electrical appliance, said method comprising:

a first step of varying the field current of said generator at the time of starting said electrical appliance so as to reduce the output of said generator by the equivalent of the output which is supplied from said engine to said electrical appliance while maintaining the revolution speed of said engine;

a second step of gradually increasing the revolution speed of said engine by varying the field current of said generator while comparing the output of said generator with the a gradually increasing target thereof; and a third step of operating said engine at a constant revolution speed and a constant output at the point of time where the output of said generator has reached an increased target.

2. A control method for an electrical appliance according to claim 1, further comprising:

a fourth step of varying the field current of said generator at the time of stopping said electrical appliance so as to increase the output of said generator by the equivalent of the output which is supplied from said engine to said electrical appliance while maintaining the revolution speed of said engine;

a fifth step of gradually decreasing the revolution speed of said engine by varying the field current of said generator while comparing the output of said generator with a gradually decreasing target thereof; and a sixth step of operating the engine at a constant revolution speed and a constant output at the point of time where the output of said generator has reached a decreased target.

3. A control method for an electrical appliance according to claim 1, wherein said field current is varied at the first step by setting a reference revolution speed of said engine and controlling the duty ratio of the field current in accordance with a signal with the duty ratio modulated on the basis of the difference between the revolution speed of said engine and said reference revolution speed thereof.

4. A control method for an electrical appliance according to claim 1, wherein said field current is varied at the second step by repeating the operation of minutely varying a reference revolution speed of said engine and the operation of controlling the duty ratio of the field current in accordance with a signal with the duty ratio modulated on the basis of the difference between the revolution speed of said engine and said reference revolution speed thereof.

5. A control method for an electrical appliance according to claim 2, wherein said field current is varied at the fifth step by setting a reference revolution speed of said engine and controlling the duty ratio of the field current in accordance with a signal with the duty ratio modulated on the basis of the difference between the revolution speed of said engine and said reference revolution speed thereof.

6. A control method for an electrical appliance according to claim 2, wherein said field current is varied at the fourth step by repeating the operation of minutely varying a reference revolution speed of said engine and the operation of controlling the duty ratio of the field current in accordance with a signal with the duty ratio modulated on the basis of the difference between the revolution speed of said engine and said reference revolution speed thereof.

7. A control method for an electrical appliance according to claim 1, wherein said field current is varied at the first and second steps with reference to a map which shows the relationship between the revolution speed of said engine, and the output and the field current of said generator.

8. A control method for an electrical appliance according to claim 2, wherein said field current is varied at the fourth and fifth steps with reference to a map which shows the relationship between the revolution speed of said engine, and the output and the field current of said generator.

9. A control method for an electrical appliance in a hybrid vehicle having a motor for generating driving power for said vehicle, a generator which can control a field current and which supplies the generated driving power to said motor, and an engine for rotating said generator and driving said electrical appliance, said method comprising:

a first step of varying the field current of said generator at the time of stopping said electrical appliance so as to increase the output of said generator by the equivalent of the output which is supplied from said engine to said electrical appliance while maintaining the revolution speed of said engine;

a second step of gradually decreasing the revolution speed of said engine by varying the field current of said generator while comparing the output of said generator with a gradually decreasing target thereof; and a third step of operating the engine at a constant revolution speed and a constant output at the point of time where the output of said generator has reached a decreased target.

10. A control method for an electrical appliance according to claim 9, wherein said field current is varied at the second step by setting a reference revolution speed of said engine and controlling the duty ratio of the field current in accordance with a signal with the duty ratio modulated on the basis of the difference between the revolution speed of said engine and said reference revolution speed thereof.

11. A control method for an electrical appliance according to claim 9, wherein said field current is varied at the first step by repeating the operation of minutely varying a reference revolution speed of said engine and the operation of controlling the duty ratio of the field current in accordance with a signal with the duty ratio modulated on the basis of the difference between the revolution speed of said engine and said reference revolution speed thereof.

12. A control method for an electrical appliance according to claim 9, wherein said field current is varied at the first and second steps with reference to a map which shows the relationship between the revolution speed of said engine, and the output and the field current of said generator.

13. A control method for an electrical appliance in a hybrid vehicle having a motor for generating driving power for said vehicle, a generator which can control a field current and which supplies the generated driving power to said motor, and an engine for rotating said generator and driving said electrical appliance, said method comprising:

a first step of varying the field current of said generator at the time of starting said electrical appliance so as to reduce the output of said generator by the equivalent of the output which is supplied from said engine to said electrical appliance while maintaining the revolution speed of said engine;

an second step of gradually increasing the output of said engine while maintaining the revolution speed of said engine and comparing the output of said generator with a gradually increasing target thereof; and a third step of operating the engine at a constant revolution speed and a constant output at the point of time where the output of said generator has reached an increased target.

14. A control method for an electrical appliance according to claim 13, further comprising:

a fourth step of varying the field current of said generator at the time of stopping said electrical appliance so as to increase the output of said generator by the equivalent of the output which is supplied from said engine to said electrical appliance while maintaining the revolution speed of said engine;

an fifth step of gradually decreasing the output of said engine while maintaining the revolution speed of said engine and comparing the output of said generator with a gradually decreasing target thereof; and a sixth step of operating the engine at a constant revolution speed and a constant output at the point of time where the output of said generator has reached a decreased target.

15. A control method for an electrical appliance in a hybrid vehicle having a motor for generating driving power for said vehicle, a generator which can control a field current and which supplies the generated driving power to said motor, and an engine for rotating said generator and driving said electrical appliance, said method comprising:

a first step of varying the field current of said generator at the time of stopping said electrical appliance so as to increase the output of said generator by the equivalent of the output which is supplied from said engine to said electrical appliance while maintaining the revolution speed of said engine;

an second step of gradually decreasing the output of said engine while maintaining the revolution speed of said engine and comparing the output of said generator with a gradually decreasing target thereof; and a third step of operating the engine at a constant revolution speed and a constant output at the point of time where the output of said generator has reached a decreased target.

* * * * *